Patented June 5, 1928.

1,672,646

UNITED STATES PATENT OFFICE.

MARCEL JEAN LOUIS LEDRU AND EDOUARD JOSEPH BACHMANN, OF ROUSSILLON, FRANCE, ASSIGNORS TO SOCIETE CHIMIQUE DES USINES DU RHONE, OF PARIS, FRANCE.

PROCESS FOR THE PREPARATION OF ETHYLIDENE DIACETATE.

No Drawing. Application filed January 22, 1926, Serial No. 83,108, and in France September 18, 1925.

In a co-pending specification of Bouvier et al., Serial No. 51,038, dated 18th August, 1925, a process for manufacture of ethylidene diacetate has been described, by absorption of acetylene in acetic acid in presence of a mercuric salt of a strong acid, characterized by the presence of a free strong acid and of such a quantity of acetic anhydride that there is always in the absorbing liquid an excess of acetic anhydride.

According to this invention, in the above reaction, the mercuric salt can be replaced by metallic mercury provided the reaction takes place in presence of anhydrous ferric sulphate.

This discovery removes the necessity of transforming the mercury into its salt. It follows that the preparation of ethylidene diacetate is greatly facilitated, for, whether the preparation is continuous or discontinuous, the metallic mercury can be recovered by simply decanting continuously or discontinuously, and it can be used over again.

*Example.*—50 parts (more or less) of metallic mercury are introduced with stirring in 1000 parts by weight of glacial acetic acid raised to 80° C., and 20 parts of anhydrous ferric sulphate are then added. A mixture of 65 parts of acetic anhydride, 50 parts of sulphacetic acid, and 125 parts of glacial acetic acid is also added.

Stirring is resorted to and a current of acetylene, purified or not, is passed through.

Towards the end of the operation, the mixture of diacetate and acetic acid is almost colourless and gives a perfectly clear liquid by allowing to stand and decanting. The ethylidene diacetate carrying the ferrous sulphate formed, may be drawn off, the mercury being left in the apparatus. This feature, of a very great technical importance, allows the process to be carried out on an intensive scale and in a continuous manner.

When conducted in this manner the operation gives a yield of 1500 parts of raw ethylidene diacetate which, purified, yield 1200 parts of pure ethylidene diacetate.

What we claim and desire to secure by Letters Patent is:—

1. A process for the preparation of ethylidene diacetate by absorption of acetylene in acetic acid in presence of metallic mercury, anhydrous ferric sulphate, acetic anhydride and an acid containing an inorganic acid radical.

2. A process for the preparation of ethylidene diacetate by absorption of acetylene in acetic acid in presence of metallic mercury, anhydrous ferric sulphate, acetic anhydride and sulphacetic acid.

3. A process for the preparation of ethylidene diacetate by absorption of acetylene in a mixture of 1125 parts by weight of glacial acetic acid, 65 parts of acetic anhydride, 50 parts of sulphacetic acid, in the presence of approximately 50 parts of metallic mercury and 20 parts of anhydrous ferric sulphate, and drawing off the ethylidene diacetate formed.

4. A process for the preparation of ethylidene diacetate, consisting in introducing 50 parts of mercury and 20 parts of anhydrous ferric sulphate in 1000 parts of glacial acetic acid, then adding a mixture of 65 parts of acetic anhydride, 50 parts of sulphacetic acid and 125 parts of glacial acetic acid; absorbing acetylene in the mixture obtained, all these operations taking place at 80° C. with stirring; and after the operation, separating the ethylidene diacetate formed.

In testimony whereof we have signed our names to this specification.

MARCEL JEAN LOUIS LEDRU.
EDOUARD JOSEPH BACHMANN.